US007155947B2

(12) United States Patent
Bertani

(10) Patent No.: US 7,155,947 B2
(45) Date of Patent: Jan. 2, 2007

(54) LOCKING CONTROL KNOB

(75) Inventor: Alberto Bertani, Milan (IT)

(73) Assignee: Elesa, S.p.A., Milan (IT)

( * ) Notice: Subject to any disclaimer, the term of this patent is extended or adjusted under 35 U.S.C. 154(b) by 254 days.

(21) Appl. No.: 10/871,953

(22) Filed: Jun. 18, 2004

(65) Prior Publication Data

US 2005/0023845 A1 Feb. 3, 2005

(30) Foreign Application Priority Data

Jul. 17, 2003 (IT) ........................ MI20030335 U

(51) Int. Cl.
*B60R 25/02* (2006.01)

(52) U.S. Cl. ............................ 70/217; 70/210; 70/216

(58) Field of Classification Search .................. 70/210, 70/DIG. 20, 215–217; 312/198, 201
See application file for complete search history.

(56) References Cited

U.S. PATENT DOCUMENTS

| | | | | | |
|---|---|---|---|---|---|
| 1,076,835 | A | * | 10/1913 | Lyons | 70/182 |
| 1,409,429 | A | * | 3/1922 | Tanski | 70/129 |
| 1,539,446 | A | * | 5/1925 | Vincent | 70/215 |
| 1,558,637 | A | * | 10/1925 | Ruthenburg | 70/210 |
| 1,574,321 | A | * | 2/1926 | Vincent | 70/215 |
| 1,707,458 | A | * | 4/1929 | Clench | 301/35.61 |
| 1,890,896 | A | * | 12/1932 | Barr | 70/215 |
| 3,877,261 | A | * | 4/1975 | Robins | 70/90 |
| 4,138,173 | A | * | 2/1979 | Taniwaki | 312/198 |
| 4,256,355 | A | | 3/1981 | Yamaguchi et al. | |
| 4,523,794 | A | * | 6/1985 | Peterman | 312/201 |
| 4,527,680 | A | | 7/1985 | Sato | |
| 4,565,078 | A | * | 1/1986 | Solomon | 70/95 |
| 4,723,569 | A | | 2/1988 | Ellis | |
| 5,133,265 | A | * | 7/1992 | Lahti et al. | 105/96 |
| 5,148,754 | A | | 9/1992 | Lahti et al. | |
| 5,634,358 | A | * | 6/1997 | Myers | 70/233 |
| 5,901,590 | A | * | 5/1999 | Lai | 70/416 |
| 6,178,789 | B1 | * | 1/2001 | Finkelstein et al. | 70/210 |
| 6,763,742 | B1 | * | 7/2004 | Lehmann | 74/527 |
| 6,843,084 | B1 | * | 1/2005 | Porter | 70/208 |

* cited by examiner

*Primary Examiner*—Suzanne Dino Barrett
(74) *Attorney, Agent, or Firm*—Pearne & Gordon LLP

(57) ABSTRACT

A control knob having a locking mechanism that can be pressure-activated and controlled from the outside by the operator. When activated, the locking mechanism engages a structure on which the knob is mounted, preventing the rotation of the knob. The locking mechanism includes a keylock having a latch that can be turned with a key so as to engage a catch of the knob-housing seat of the locking mechanism.

7 Claims, 3 Drawing Sheets

LOCKING CONTROL KNOB

BACKGROUND OF THE INVENTION

The present invention relates to a control knob that incorporates locking provisions which, when operated, serve to inhibit rotation.

Such control knobs, well known for some time and for a wide variety of uses and applications especially but not exclusively on engines and machinery, are devices that encompass a usually round crown rim and a disk or spokes-and-hub wheel, whereby, sometimes with the aid of a handle, the crown rim turns a spindle to which the hub is connected, permitting convenient control or regulating operations.

In most cases these operations take place between positions that are set or determined by the operator without the need or practicality of preventively selecting them with precision or maintaining them in a fixed, secure setting. The majority of the known control knobs, however, do not have locking provisions.

Yet there are cases in which locking the control knob (and with it the spindle turned by it) in or near a certain position can be very convenient and sometimes extremely useful.

In one particularly significant case (but there may be many others), the knob controls the movement of rolling file cabinets: Traditionally, these cabinets that roll in tracks and are in contact with one another when in their idle position, are moved in tandem along the tracks to permit access to their contents, by operating for each of them a control knob whose spindle controls a gear system which activates an element that sets the file cabinet in motion. Access to these file cabinets is often controlled along various authorization levels and is therefore not open to everybody. This creates the need for means that serve to ensure specific access restriction, selectively assigning accessibility to individual cabinets of the rolling files. Moreover, it is equally necessary to prevent ill-intentioned access to the files after working hours, e.g. at the end of the day.

One should also keep in mind that when, as is most often the case, access to the rolling files is open and possible for several persons at the same time, it takes only carelessness on the part of one of them to endanger the others: Even a minor movement of one or more cabinets triggered by the turning of one of the control knobs by a distracted operator can in fact put the others at risk of sustaining a few bruises.

BRIEF SUMMARY OF THE INVENTION

The present invention provides control knobs that can be locked at the end of every operation and can then be unlocked for the next operation. These are control knobs that incorporate pressure-activated locking provisions which are controlled by the operator from the outside and, when activated, engage in the structure on which the knob is mounted, thus inhibiting any rotation of the knob itself. Advantageously these provisions comprise in the knob an axially movable plunger whose head protrudes toward the outside and connects internally to at least one projecting pin, while in the structure on which the knob is mounted a plurality of holes serve to accept that pin and the plunger head is usually aligned with the hub of the knob and can be operated with one hand.

The present invention may further improve, in substantial fashion, the access protection of structures as offered by this type of control knobs (especially that of rolling files referred to above, both during and after working hours), eliminating the risk of an accidental or erroneous shift out of the locked position with consequential hazards.

To that effect, the plunger assembly in the control knob according to the present invention is provided with a keylock for inhibiting its axial movement, which keylock comprises a latch that rotates under the control of a key inserted in the plunger head, and a catch positioned in the bottom of the knob housing proper.

This concept is applied in disk-type knobs in which the plunger is positioned in the center of the control knob itself, lined up with the hub and provided in its center with a slot for accepting a removable key.

While there are a great many applications and uses for a control knob with locking means according to the invention, one of its particularly interesting applications, for the reasons explained above, is the securing of a rolling file cabinet: The knob serves not only to control, via an appropriate rack and pinion system actuated by the spindle which in turn is operated by the knob, the movement of the cabinet to which it is attached but it also permits the suppression of any such movement and/or the movement of a group of cabinets in tandem or direct access to the files by those not in possession of the key to the control knob.

BRIEF DESCRIPTION OF THE DRAWINGS

The following will describe this concept in more detail, strictly as an example as applied in the manipulation of rolling file cabinets, with reference to the attached drawings.

DETAILED DESCRIPTION OF THE INVENTION

Figure 1:
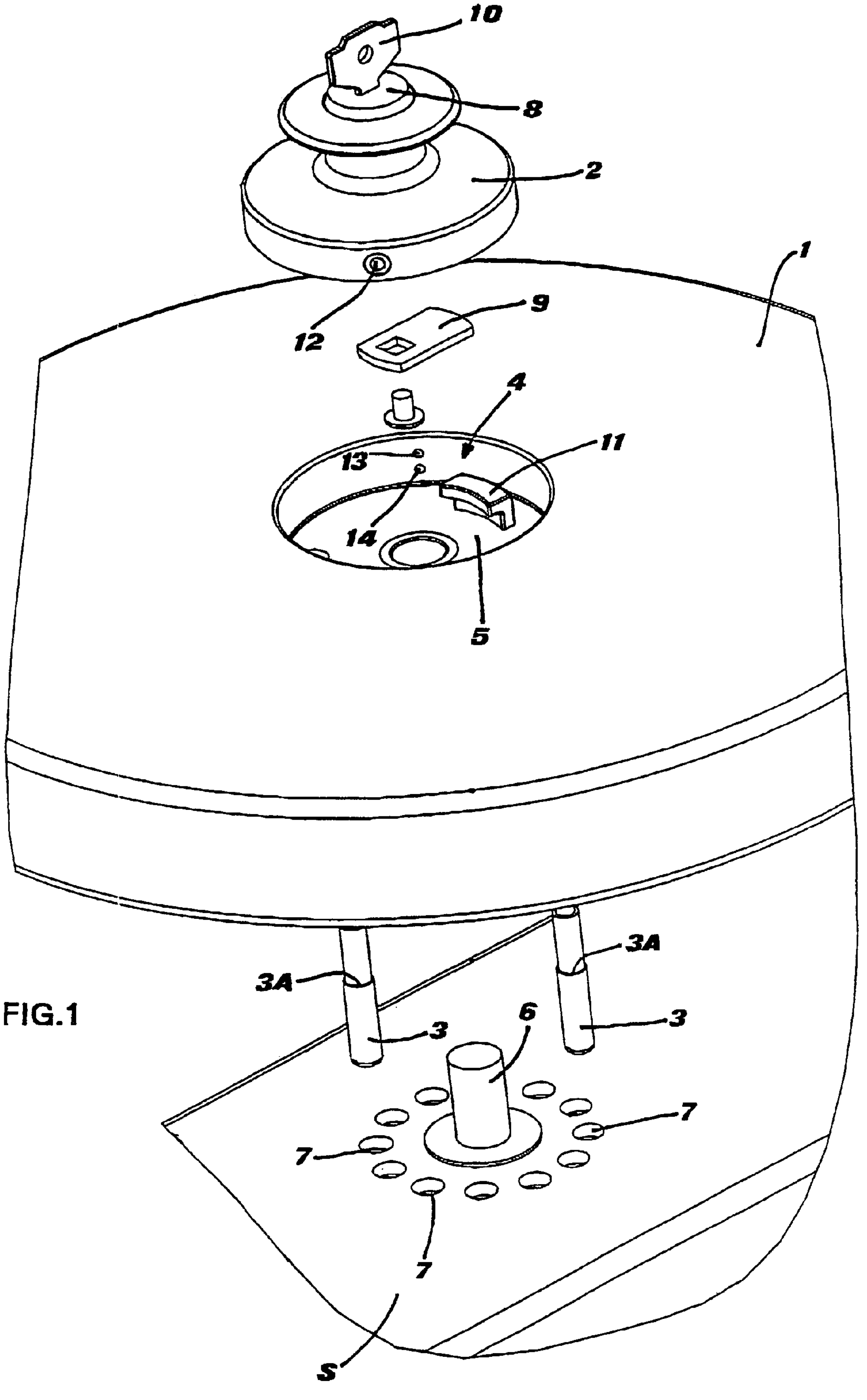
FIG. 1 is a perspective cutaway view of the center section of a control knob of the present invention having a locking mechanism.

As shown in the drawings, the control knob 1 according to this invention, in the form of a simple disk-type knob without a handle but could be configured in any other way, incorporates in the middle or hub region, a plunger assembly 2 that is axially movable and whose head protrudes to the outside where it can be easily grasped with one hand. The plunger assembly 2 includes on the inside two pins 3 which are positioned diametrically opposite each other and project through appropriately provided holes into the base 5 of the cavity 4 in the center of the knob 1 that accommodates the plunger assembly 2. Jointly rotating with the base 5, in conventional fashion, is a drive spindle 6 by way of which the knob 1 connects to a structure S (FIG. 1) for executing the intended control or regulating function.

Figure 2:
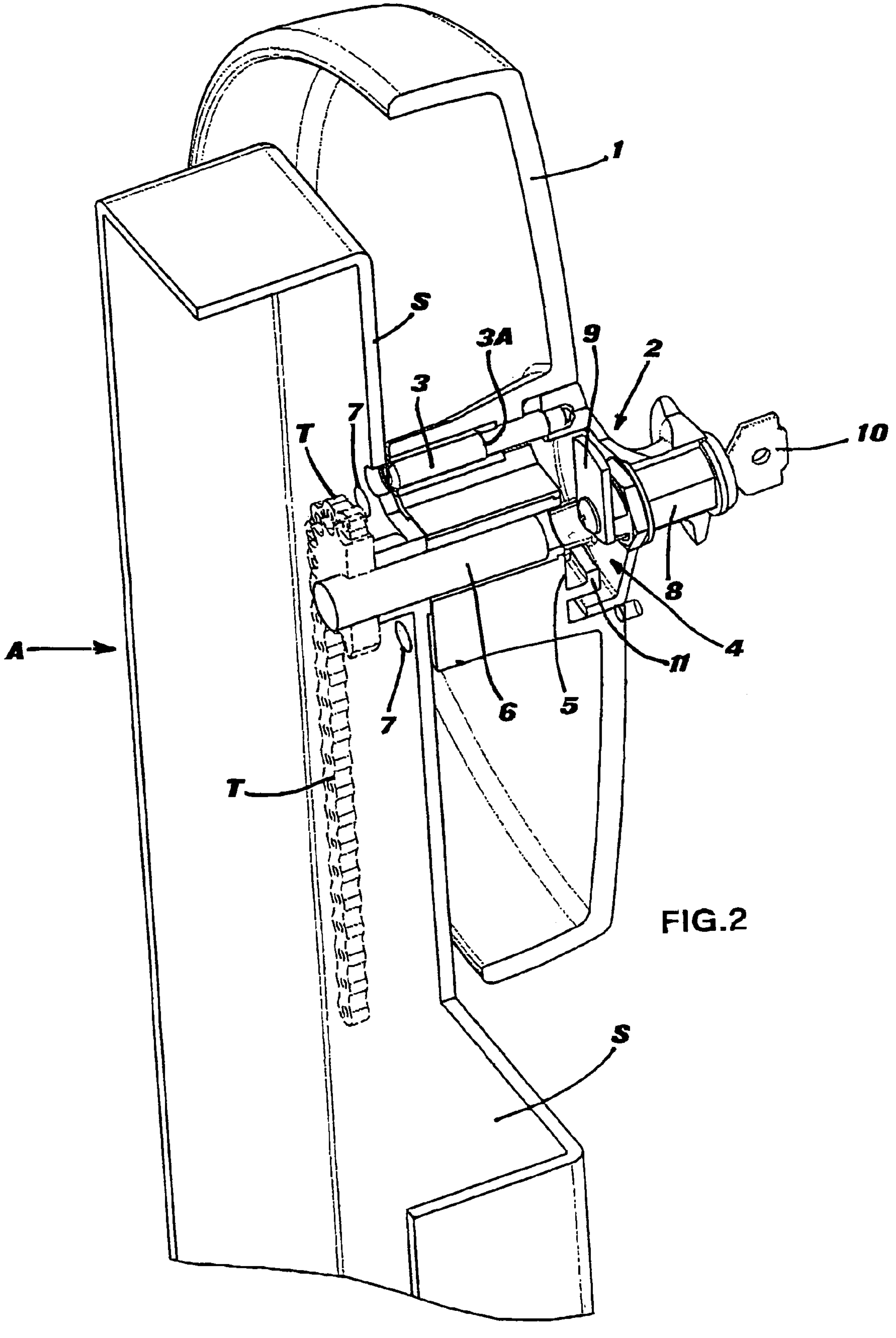
FIG. 2 is a perspective view of the control knob of FIG. 1, mounted on the front panel of a rolling file cabinet and in its open operating position.
Figure 3:
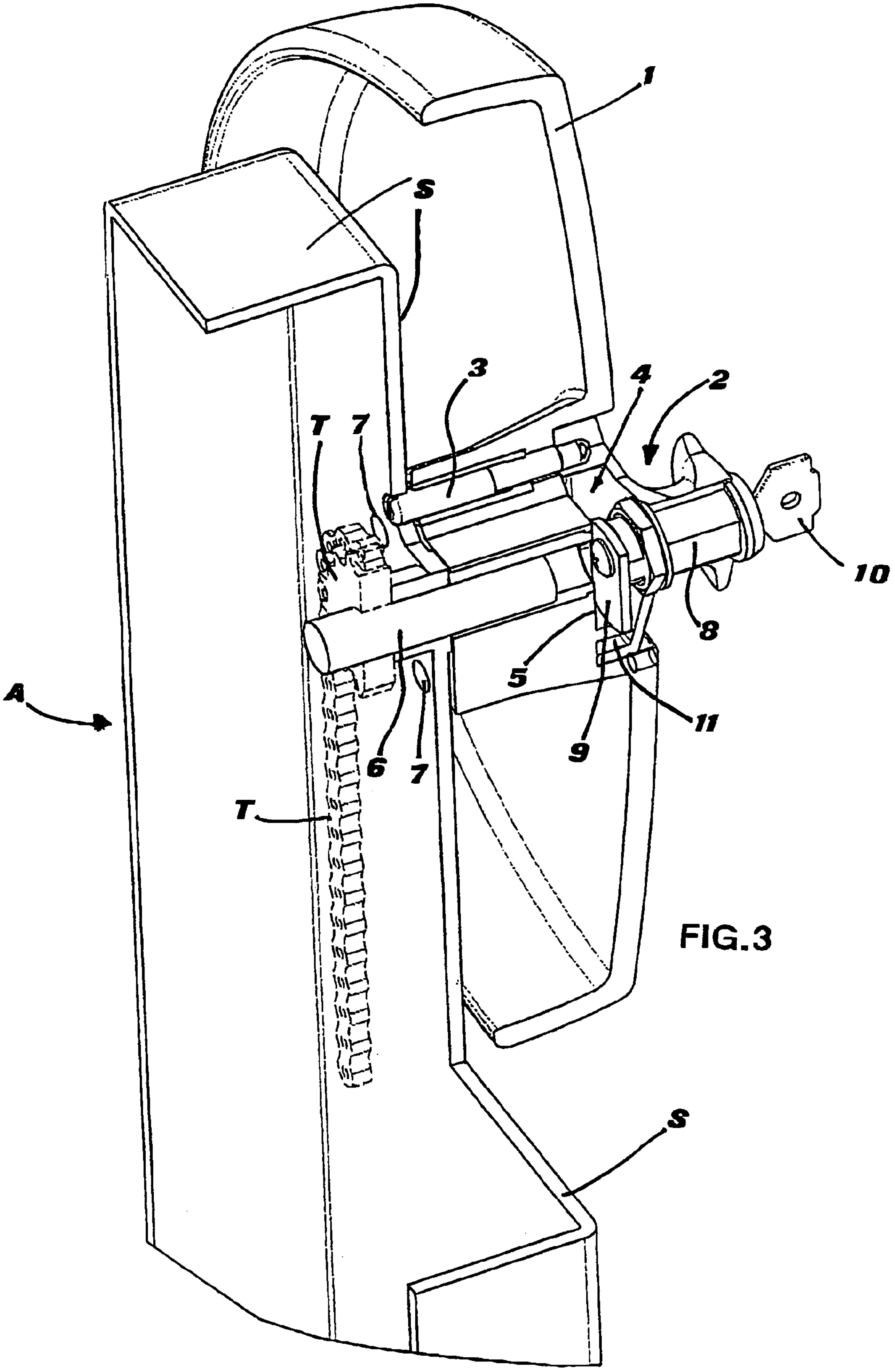
FIG. 3 is a perspective view of the control knob of FIG. 1, mounted on the front panel of a rolling file cabinet and in its locked position.

In the embodiments of FIGS. 2 and 3, the structure S is the cabinet wall panel A of a rolling file on which the control knob 1 is mounted. In that application the drive spindle 6 controls, in conventional fashion via the chain-rack and pinion transmission T', the movement of the file cabinet A on the track of the rolling files.

The structure 1 is provided with a plurality of holes 7 evenly distributed along the perimeter with the same inter-axial distance as that of the two pins 3 of the plunger assembly 2, thus serving to receive the pins 3 when the normally protruding plunger head 2 is pushed in toward the base 5 of the cavity 4. Together, the pins 3 and the holes 7 constitute the interlocking provisions of the control knob.

According to the invention, the interlocking provisions are equipped with a keylock 8 that is incorporated in the plunger assembly 2 and comprises a latch 9 that can be turned with a key 10, as well as a catch 11 that is set into a projection of the base 5 in the cavity 4.

It should be noted that the positions, both locked and unlocked, of the plunger assembly 2 in the cavity 4 are secured relative to the outside by means of shoulders 3A of the pins 3 which butt against the rim of the through-holes in the base 5 as well as against the inside of the entire plunger assembly 2 where it meets the base 5. In addition, to stabilize these positions, spring-loaded balls 12 protrude from the perimeter of the plunger head 2 to resiliently engage in suitably spaced recesses 13 and 14 in the wall of the cavity 4.

During operation, light pressure applied on the plunger head 2 in its outermost functional position, together with small turns of the knob 1, will in traditional fashion allow the two pins 3 of the plunger assembly 2 to be inserted in a pair of holes 7 of the structure S, moving the plunger 2 into its innermost interlocking position.

Engaging the pins 3 in the holes 7 also locks the control knob 1 in the desired angular position.

According to the invention, this locking position can be secured by means of the key 10 which engages the latch 9 in the catch 11, thus preventing any further axial movement of the plunger 2 and with it any undesired disengagement of the pins 3 from the holes 7. Removing the key 10 provides an additional safety factor. To release the interlock, after opening the keylock 8, one merely pulls the plunger 2 outward, returning it from the interlocked position into its free operating position.

FIGS. 2 and 3 rather clearly illustrate the function of the control knob by way of the locking provisions according to the invention when applied on the wall panel S of the cabinet A of a rolling file, with FIG. 2 showing the open operating position and FIG. 3 the locked position of the control knob.

In the case of the open operating state, with the plunger assembly 2 retracted, the operator can turn the knob 1, thus opening up a space between the cabinets for accessing the files or the part thereof to which he is enabled by means of the key. Before entering the files for his particular activities the operator, by applying light pressure, lowers the plunger 2 and turns the key 10. The pins 3 engage in the holes 7 of the file cabinet A and cannot be retracted without turning the key that is normally removed by the operator who activates the interlock of the control knob. It is thus possible to prevent any further movement of one or several (or all) of the rolling file cabinets by some other operator.

Upon completion of his file work the operator reinserts the key 10 in the slot of the keylock 8, turns the latch 9, disengaging it from the catch 11 and at that point he can again retract the plunger 2; the file cabinet or a group or all thereof are once again available to all.

Also, at the end of the working day the "responsible" operator, after having closed the mobile files, can push in the keylock-equipped plunger assembly of the control knob 1 mounted on cabinet A for locking the files (or part thereof if they include files with different restriction levels), by turning the key 10 and thus moving the latch 9 of the keylock 8 into the catch 11. After having turned the key, the operator can pull and remove it, thus ensuring the prevention of any outsider or incompetent or unauthorized person opening a group or all of the file cabinets and gaining access to the files or a section thereof after working hours, until he can intervene again.

The interlocking system plus keylock can be used in a single control knob, or on part or all of the control knobs of the rolling file cabinets, depending on the security and restriction levels applying to the documents filed in the cabinets concerned.

Of course, the control knob with interlocking provisions and keylock according to this invention may be designed in ways different from those described above and illustrated in detail while serving purposes identical to those described. For example, the control knob may employ a spoke wheel as well as a disk, with or without a handle; the locking provisions may be attached to the control knob in positions other than the central position illustrated (which, however, appears to be the most practical); the plunger assembly may include a different number of interlocking pins or bolts whose form may also be varied. All such variations naturally fall within the scope of patent protection of this invention.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

The invention claimed is:

1. A control knob for mounting on a structuring provided with a plurality of holes, the control knob comprising a locking mechanism that is pressure-activated and controlled externally by an operator, the locking mechanism comprising:

an axially movable plunger assembly that is aligned with a hub of the control knob, that can be operated with one hand, and that protrudes outward from the control knob;

at least one projecting pin carried by the plunger assembly for engaging the plurality of holes;

a keylock that is carried by the plunger assembly, the keylock having a latch that can be turned with a key; and a catch in which the latch engages for preventing axial movement of the plunger assembly;

wherein when the locking mechanism is activated, the locking mechanism engages the structure on which the control knob is mounted and inhibits rotation of the control knob.

2. The control knob of claim 1, wherein the key is removable from the keylock.

3. The control knob of claim 1, wherein the control knob is attached to a wall panel of a rolling file cabinet having a gear transmission for rolling, and wherein the transmission is under the control of a spindle that is operated by the control knob for locking the transmission in a desired position by utilizing the at least one projecting pin and the keylock.

4. A control knob for mounting on a structuring provided with a drive spindle and a plurality of holes, the control knob comprising a hub to be connected for joint rotation with the drive spindle, and a locking mechanism that is pressure-activated and controlled externally by an operator, the locking mechanism comprising:

an axially movable plunger assembly that is coaxially aligned with the hub of the control knob, that can be operated with one hand, and that protrudes outward from the control knob;

at least one projecting pin provided on the plunger assembly for engaging the plurality of holes;

a keylock having a latch that can be turned with a key; and a catch in which the latch engages for preventing axial movement of the plunger assembly;

wherein when the locking mechanism is activated, the locking mechanism engages the structure on which the control knob is mounted and inhibits rotation of the control knob.

5. The control knob of claim 4, wherein the keylock is carried by the plunger assembly.

6. The control knob of claim 4, further comprising a cavity in the center of the knob for accommodating the axially movable plunger assembly, wherein the catch is set into a projection of a base of the cavity.

7. The control knob of claim 4, wherein the keylock is coaxially aligned with the plunger assembly and the hub.

* * * * *

UNITED STATES PATENT AND TRADEMARK OFFICE

CERTIFICATE OF CORRECTION

PATENT NO. : 7,155,947 B2
APPLICATION NO. : 10/871953
DATED : January 2, 2007
INVENTOR(S) : Alberto Bertani It is certified that error appears in the above-identified patent and that said Letters Patent is hereby corrected as shown below:

In column 2, line 63, delete "1" and insert therefor --S--.

Signed and Sealed this

Fifth Day of February, 2008

JON W. DUDAS
*Director of the United States Patent and Trademark Office*